(12) United States Patent
Blake

(10) Patent No.: US 6,481,734 B1
(45) Date of Patent: Nov. 19, 2002

(54) TRAILER HITCH COVER ASSEMBLY

(75) Inventor: Robert B. Blake, Ferndale, MI (US)

(73) Assignee: Blake Design Group, LLC., Troy, MI (US)

( * ) Notice: Subject to any disclaimer, the term of this patent is extended or adjusted under 35 U.S.C. 154(b) by 0 days.

(21) Appl. No.: 09/716,666

(22) Filed: Nov. 20, 2000

Related U.S. Application Data

(63) Continuation-in-part of application No. 09/183,104, filed on Oct. 30, 1998, now Pat. No. 6,176,506, which is a continuation-in-part of application No. 08/795,481, filed on Feb. 11, 1997, now Pat. No. 5,934,699.

(51) Int. Cl.[7] .................................................. B62C 7/00
(52) U.S. Cl. ..................................................... 280/186
(58) Field of Search ..................... 280/186; 248/229.12, 248/229.14, 229.22, 229.24

(56) References Cited

U.S. PATENT DOCUMENTS

| 2,080,161 | A |   | 5/1937  | Berggren |
| D192,684  | S |   | 5/1962  | Knowles |
| 3,058,757 | A |   | 10/1962 | Sullivan |
| 3,095,058 | A |   | 6/1963  | Woytowich |
| 3,746,366 | A |   | 7/1973  | Bruce et al. |
| 4,138,130 | A |   | 2/1979  | Pickrell et al. |
| 4,196,918 | A | * | 4/1980  | Strader .................... 280/478 R |
| 4,319,764 | A |   | 3/1982  | Whitaker |
| 4,798,409 | A |   | 1/1989  | Miller |
| 4,928,993 | A |   | 5/1990  | Appavoo |
| 4,966,378 | A |   | 10/1990 | Cook |
| 5,121,944 | A |   | 6/1992  | Haddox |
| 5,560,631 | A |   | 10/1996 | Salvo |
| 5,628,536 | A |   | 5/1997  | Fulkerson |
| 5,934,699 | A |   | 8/1999  | Blake |
| 6,176,506 | B1 |  | 1/2001  | Blake |
| 6,209,898 | B1 | * | 4/2001  | Fortier ...................... 280/187 |

* cited by examiner

*Primary Examiner*—Douglas C. Butler
*Assistant Examiner*—C. T. Bartz
(74) *Attorney, Agent, or Firm*—Bliss McGlynn, P.C.

(57) ABSTRACT

A trailer hitch cover assembly includes a clamp assembly having an aperture extending longitudinally therethrough to fit over a hitch tube of a trailer hitch on a motor vehicle. The clamp assembly also includes an inner clamp disposed over the hitch tube and an outer clamp disposed over the inner clamp. The trailer hitch cover assembly further includes a front cover mounted to the clamp assembly and having an aperture extending therethrough aligned with the hitch tube of the trailer hitch.

4 Claims, 7 Drawing Sheets

TRAILER HITCH COVER ASSEMBLY

CROSS-REFERENCE TO RELATED APPLICATION(S)

The present application is a continuation-in-part of U.S. Ser. No. 09/183,104, filed Oct. 30, 1998, now U.S. Pat. No. 6,176,506, which is a continuation-in-part of U.S. Ser. No. 08/795,481, filed Feb. 11, 1997, now U.S. Pat. No. 5,934,699.

BACKGROUND OF THE INVENTION

1. Field of the Invention

The present invention relates generally to motor vehicles and, more particularly, to a trailer hitch cover assembly for a motor vehicle.

2. Description of the Related Art

It is known that motor vehicles may be provided with a trailer hitch to pull a trailer. Typically, the motor vehicle has a trailer hitch having a hitch tube secured to the motor vehicle beneath the bumper and a ball connector having an insert tube disposed in the hitch tube. A locking pin extends through the tubes to secure the insert tube to the hitch tube. The trailer generally includes a tongue beam which is releasibly attached to the ball connector as is known in the art.

Although the above trailer hitch has worked well for towing a trailer by a motor vehicle, it suffers from the disadvantage that the trailer hitch is subjected to stones and other road debris forcefully hurled by the wheels of either the motor vehicle and/or trailer which may result in degradation of appearance or physical damage to the trailer hitch. Therefore, there is a need in the art to provide a trailer hitch cover for a motor vehicle.

SUMMARY OF THE INVENTION

It is, therefore, one object of the present invention to provide a trailer hitch cover assembly for a motor vehicle.

It is another object of the present invention to provide a trailer hitch cover assembly which shields a trailer hitch and motor vehicle against stones and debris.

It is yet another object of the present invention to provide a trailer hitch cover assembly which provides a decorative appearance to the motor vehicle.

It is still another object of the present invention to provide a trailer hitch cover assembly which includes an electronic signaling mechanism mounted on the trailer hitch cover assembly.

It is still yet another object of the present invention to provide a trailer hitch cover assembly which includes an electronic locking pin.

It is a further object of the present invention to provide a trailer hitch cover assembly which includes an anti-vibration mechanism.

It is still a further object of the present invention to provide a trailer hitch cover assembly which includes a spacer.

It is yet a further object of the present invention to provide a trailer hitch cover assembly which includes a cover attached to a pair of interlocking u-shaped clamps.

It is still yet a further object of the present invention to provide a trailer hitch cover assembly having a step with a step support.

It is yet still a further object of the present invention to provide a trailer hitch cover assembly that is adjustable.

To achieve the foregoing objects, the present invention is a trailer hitch cover assembly for a motor vehicle. The trailer hitch cover assembly includes a hitch insert having an aperture extending longitudinally therethrough to fit over a hitch tube of a trailer hitch on a motor vehicle, and a rotatable door covering the aperture. The trailer hitch cover assembly also includes a top cover plate mounted to the hitch insert and a front cover plate mounted to the hitch insert and having an aperture extending therethrough aligned with the hitch tube of the trailer hitch.

One advantage of the present invention is that a trailer hitch cover assembly is provided for a motor vehicle. Another advantage of the present invention is that the trailer hitch cover assembly shields the trailer hitch and motor vehicle against stones and debris from the road. Yet another advantage of the present invention is that the trailer hitch cover assembly provides a decorative appearance with additional taillight and/or reflectors to the motor vehicle and reduces the possibility of physical damage to the trailer hitch and/or motor vehicle. Still another advantage of the present invention is that the trailer hitch cover assembly includes an electronic signaling mechanism to supply a signal to a receiver, such as a toll booth PASS system. Still yet another advantage of the present invention is that the trailer hitch cover assembly includes an electronic locking pin as an additional safety feature. A further advantage of the present invention is that the trailer hitch cover assembly includes an anti-vibration mechanism to isolate the hitch tube from noise and vibration when towing. Still a further advantage of the present invention is that the trailer hitch cover assembly includes a spacer to more positively position the insert onto the hitch hook-up tube. Yet a further advantage of the present invention is that the trailer hitch cover assembly includes a pair of interlocking clamps that provides for access to the hitch tube with the cover in place. Still yet a further advantage of the present invention is that the trailer hitch cover assembly includes a step with a step support to reinforce the step. Yet still a further advantage of the present invention is that the trailer hitch cover assembly includes a hitch insert that is adjustable in a vertical direction.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
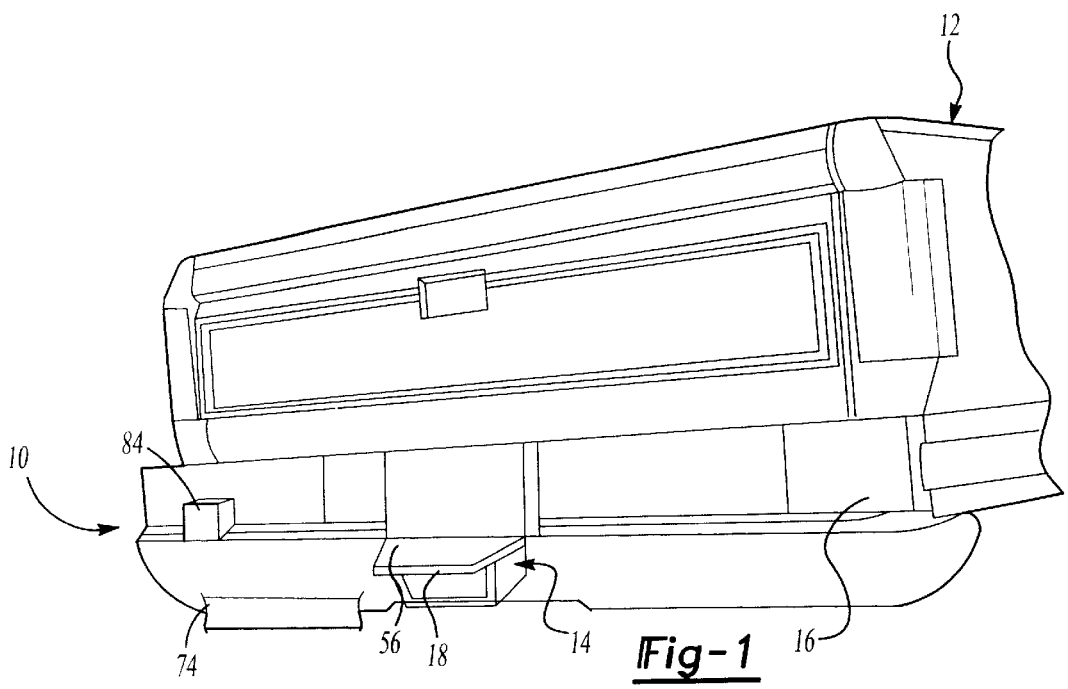
FIG. 1 is a perspective view of a trailer hitch cover assembly, according to the present invention, illustrated in operational relationship with a motor vehicle.
Figure 2:
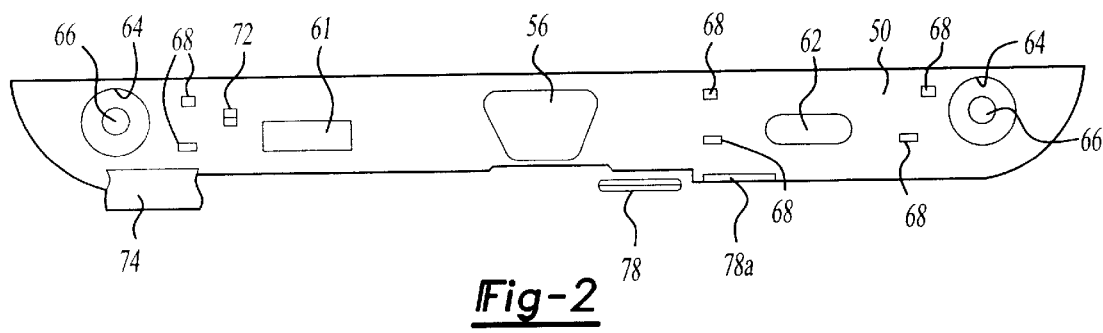
FIG. 2 is a front elevational view of the trailer hitch cover assembly of FIG. 1.

Referring to the drawings and in particular FIG. 1, one embodiment of a trailer hitch cover assembly 10, according to the present invention, is illustrated in operational relationship with a motor vehicle, generally indicated at 12. As illustrated, the motor vehicle 12 is of a pick-up truck type known in the art although any type of motor vehicle may be used in connection with the trailer hitch cover assembly 10.

The motor vehicle 12 includes a trailer hitch, generally indicated at 14, secured to structure of the motor vehicle 12 beneath a rear bumper 16 of the motor vehicle 12. The trailer hitch 14 includes a hitch tube 18 extending longitudinally of the motor vehicle 12 to receive an insert tube (not shown) of a ball connector (not shown) for the trailer hitch 14. The hitch tube 18 is generally rectangular in shape although any suitable shape may be used. It should be appreciated that the trailer hitch 14 is conventional and known in the art.

Referring to FIGS. 1 through 6, the trailer hitch cover assembly 10 includes a hitch insert 20 for connection to the hitch tube 18 of the trailer hitch 14 and/or the rear bumper 16 of the motor vehicle 12 without a trailer hitch. The hitch insert 20 includes an aperture 21 extending therethrough to allow a screw mount or ball clamp to extend through an aperture (not shown) in the rear bumper 16, thus also creating an additional locking pin.

The hitch insert 20 is generally rectangular in shape and has an aperture 22 extending longitudinally therethrough to fit over the hitch tube 18. The hitch insert 20 also has an aperture 24 extending transversely therethrough to receive a mechanically operated locking pin 25 of the trailer hitch 14 to secure the hitch insert 20 to the hitch tube 18. It should be appreciated that the locking pin 25 is extended to pass completely through the hitch insert 20.

Figure 17:
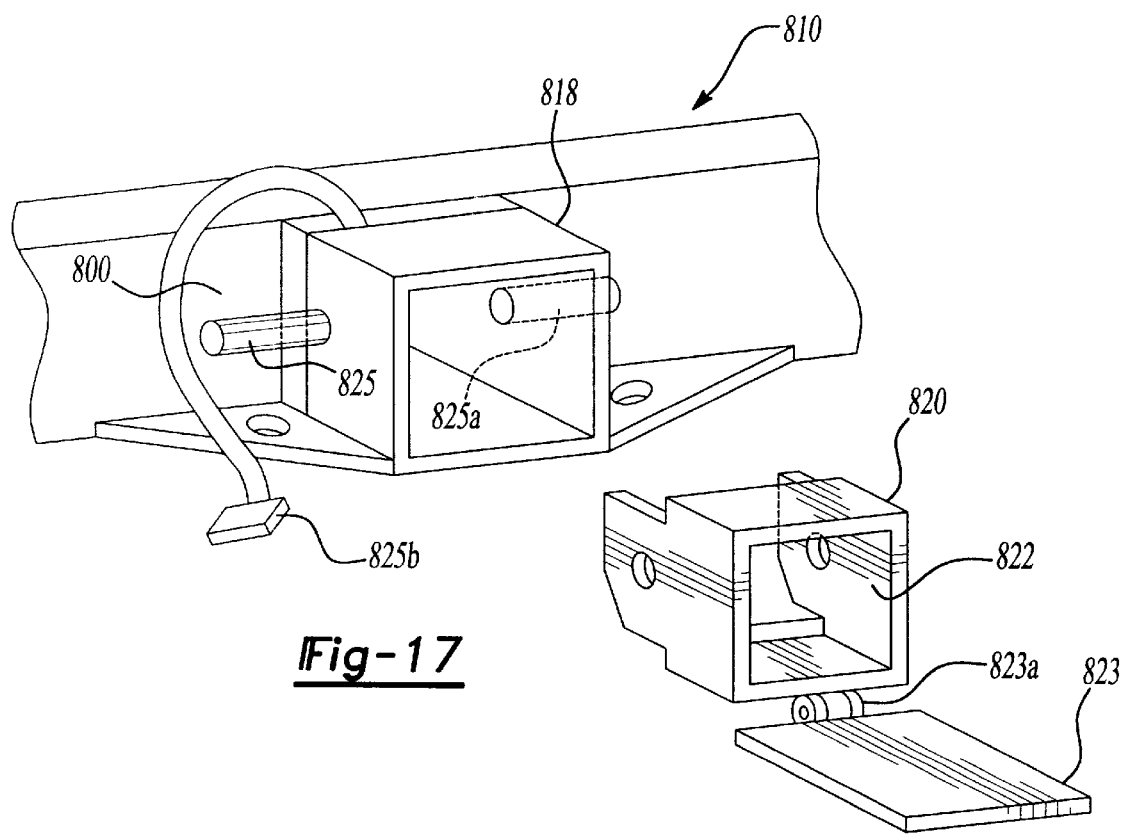
FIG. 17 is a perspective view of the hitch insert with an electronic locking pin, according to the present invention, for the trailer hitch cover assembly of FIG. 1.

Optionally, the trailer hitch cover assembly may include an electronically controlled locking pin 800, as best shown in FIG. 17. It should be appreciated that like parts of the trailer hitch cover assembly have like reference numerials increased by eight hundred (800). The electronically controlled locking pin mechanism 700 includes a locking pin 825 slidably disposed within a housing 825a. Preferably the housing 825a is a tubular member that is generally cylindrically shaped. The locking pin 825 is a solid, cylindrically shaped member having slots extending longitudinally on its surface to facilitate movement of the locking pin 825 within the housing 825a. The locking pin 825 is operably connected to an actuator 825b, such as a solenoid, that controls the movement of the locking pin 825 in and out of the housing 825a. Preferably, the actuator is positioned on the hitch tube 818. The actuator 825b is operably connected to a switch (not shown). Advantageously, the switch can be positioned within the occupant compartment so that it is readily accessible, or near the actuator 825b.

Referring back to FIGS. 1 through 6, the hitch insert 20 also includes a flange 26 extending transversely on each side at a forward end of the aperture 22 for a function to be described. The hitch insert 20 may be made of a plastic or metal material. It should be appreciated that the hitch insert 20 can be larger or smaller in size to accommodate different classes of trailer hitches such as a class 2 through 6 trailer hitch or additional size and shape for application to the motor vehicle 12 itself.

Optionally, the hitch insert 20 may also include a rotatable door 23, as best shown in FIG. 17, to cover the aperture 22. The door 23 is pivotally connected to the hitch insert 20, and urged into a closed position by hinging mechanism 23a. An example of a hinging mechanism 23a is a pin (not shown) operably connected to a spring (not shown). The door 23 is generally square in shape. Advantageously, an outer surface of the door 23 may include indicia (not shown) such as a logo or the like secured to it.

Figure 3:
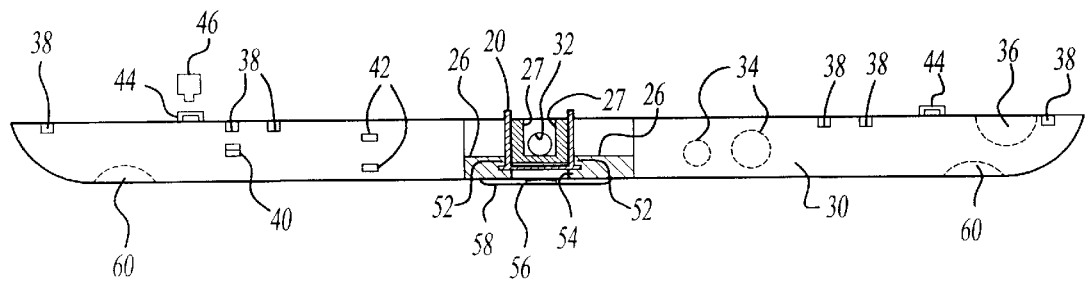
FIG. 3 is a plan view of the trailer hitch cover assembly of FIG. 1.
Figure 4:
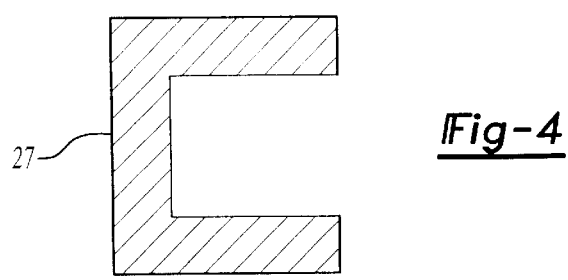
FIG. 4 is a side elevational view of a spacer for the trailer hitch cover assembly of FIG. 1.

The trailer hitch cover assembly 10 may include at least one, preferably a plurality of spacers 27, as best shown in FIGS. 3 and 4, to facilitate the connection of the hitch insert 20 to the hitch tube 18. Preferably, two spacers 27 are used although as many as four can be used. The spacer 27 is positioned between the hitch insert 20 and the hitch tube 18, to provide a solid, square fit of the hitch insert 20 onto the hitch tube 18. The spacer 27 extends longitudinally and is generally U-shaped and made of a rigid or flexible material. Preferably, the size and shape of the spacer 27 is determined by the relative fit of the hitch insert 20 onto the hitch tube 18. Advantageously, the use of a spacer 27 with the hitch insert 20 allows the trailer hitch cover assembly 10 to be used on different classes of trailer hitches 14.

Figure 5:
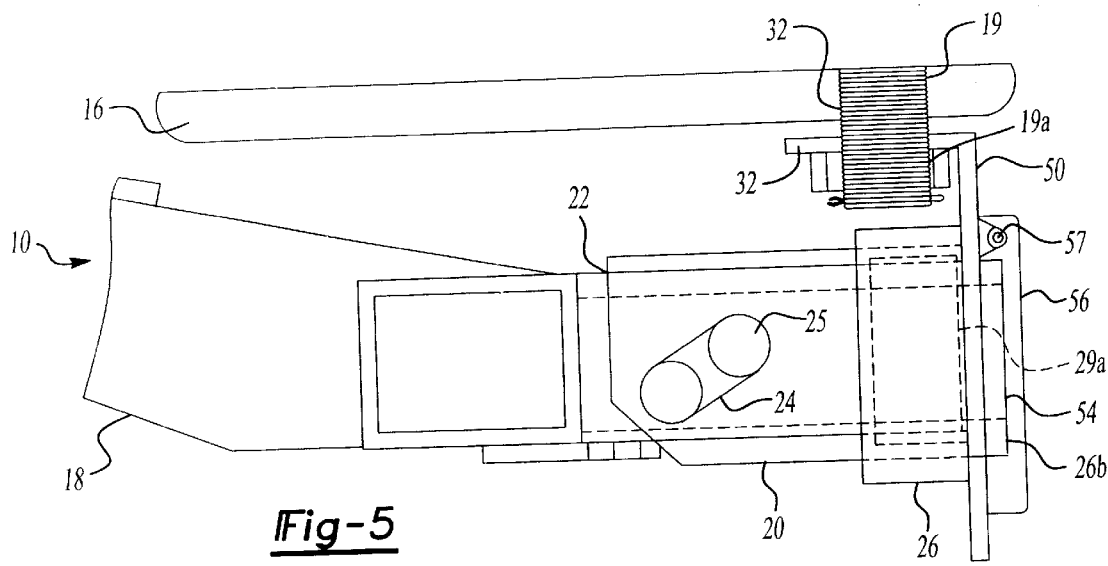
FIG. 5 is a side elevational view of a screw mount ball hitch, according to the present invention for the trailer hitch cover assembly of FIG. 1.
Figure 6:
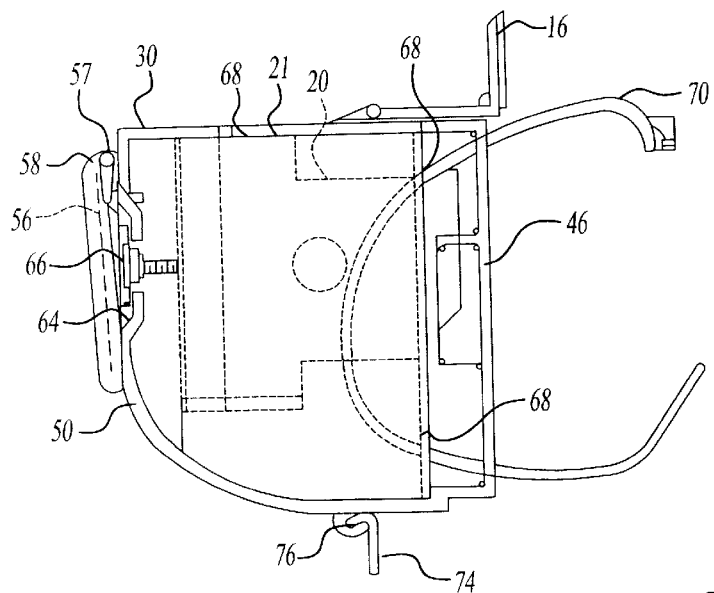
FIG. 6 is a side elevational view of the trailer hitch cover assembly of FIG. 1.

Advantageously, the trailer hitch cover assembly 10 may include an anti-vibration mechanism 29a 29b, as illustrated in FIG. 5. One example, of the anti-vibration mechanism 29a is a collar that clamps over the hitch insert 20. Another example of the antivibration mechanism 29b is a ring that fits over the hitch insert 20. The anti-vibration mechanism 29a, 29b is generally tubular and rectangular in shape. Preferably, the anti-vibration mechanism 29a, 29b is made from a vibration isolating materials, such as rubber.

The trailer hitch cover assembly 10 includes a top cover plate 30 mounted to the hitch insert 20. The top cover plate 30 extends transversely along the length of the rear bumper 16 and longitudinally a sufficient or predetermined length to provide a decorative appearance. The top cover plate 30 may include at least one aperture 32 extending therethrough to act as an access hole for a ball connector 17 secured by a nut 19a to the rear bumper 16 which is conventional and known in the art.

The top plate 30 may include at least one electrical punch-out 34 for an electrical mounting plug (not shown). The top cover plate 30 may include at least one, preferably a pair of exhaust punch-outs 36 for access to exhaust tailpipes (not shown) of the motor vehicle 12. The top cover plate 30 may also include at least one, preferably a plurality of rear access slots 38 to allow for clearance of a frame (not shown) of the trailer hitch 14. The top cover plate 30 may also include at least one clip 40 for loose wires (not shown).

The top cover plate 30 includes at least one, preferably a plurality of apertures 42 extending therethrough for a function to be described. The top cover plate 30 includes at least one, preferably a plurality of spacer clips 44 to receive a portion of corresponding spacers 46 (FIG. 4) which each have through strap application slots and extend longitudinally to space longitudinally the top cover plate 30 from the rear end of the motor vehicle 12.

The top cover plate 30 is a relatively thin piece made of a metal or plastic material. It should be appreciated that a portion of the top cover plate, such as the electrical punch-out 34 or exhaust punch-out 36, may be clear. The clear portion provides improved visibility. It should also be appreciated that in this embodiment the top cover plate 30 is not a bumper or step and is decorative while providing limited protection from stones and debris to the trailer hitch 14 and/or motor vehicle 12.

The trailer hitch cover assembly 10 further includes a front cover plate 50 mounted to the hitch insert 20. The front cover plate 50 extends transversely along the length of the rear bumper and vertically a sufficient or predetermined length to provide a decorative appearance. The front cover plate 50 includes a pair of recesses 52 spaced and extending transversely. The recesses 52 are generally rectangular in shape to receive the flanges 26 of the hitch insert 20. The front cover plate 50 also includes an aperture 54 extending longitudinally therethrough aligned with the hitch tube 18. The aperture 54 allows the insert tube (not shown) of the ball connector to extend through the front cover plate 50 and hitch insert 20 and be disposed in the hitch tube 18.

The front cover plate 50 may include a rotatable door 56 to cover the aperture 54. The door 56 is pivotally connected by a pin member 57 to the front cover plate 50 and is urged into a closed position by a spring 58. The door 56 is generally trapezoidal in shape although any suitable shape or additional insert plugs (not shown) may also be applied to cover the aperture 54. The door 56 may include indicia such as a logo or the like. It should be appreciated that the door 56 covers the aperture 54 for the insert tube to extend through, when not in use. Preferably, the anti-vibration mechanism 29a,29b, such as the ring 29a, may be positioned between the door 56 and the hitch insert 20.

The front cover plate 50 includes at least one, preferably a plurality of recesses 60 to accommodate a reflector and or light (not shown). The recesses 60 may include a punch-out (not shown) for an optional taillight. The front cover plate 50 may include at least one recess 16 for a sticker (not shown). The front cover plate 50 may include at least one clear cover plate insert 62 with side tabs (not shown) to accommodate a retail advertisement logo sticker. It should be appreciated that the clear cover plate insert 62 removably engages the front cover plate 50 and the sticker is disposed beneath the insert 62.

The front cover plate 50 may include at least one, preferably a plurality of punch-outs 64 to accommodate exhaust tailpipes of the motor vehicle 12. The punch-outs 64 may include a reflector 66. It should be appreciated that the reflector 66 may be of a snap-in or screw type for engagement with the front cover plate 50.

The front cover plate 50 is a relatively thin piece made of a metal or plastic material. The front cover plate 50 may also include a clear portion, such as the punch-outs 64. The clear portion improves visibility to provide better access behind the trailer hitch cover assembly 10.

The front cover plate 50 includes at least one, preferably a plurality of apertures 68 extending therethrough to receive straps 70 (FIG. 4). The straps 70 are made of a plastic material and wrap around the trailer hitch 14 or are connected to the rear bumper 16. Optionally, a retainer (not shown) may be used for the straps 70. The retainer may be attached to the trailer hitch cover assembly 10 or rear bumper 16 by fasteners such as screws or by an adhesive. The retainer has slots through which the straps 70 slide. It should be appreciated that the straps 70 are of a tie type and are known in the art.

The front cover plate 50 may include at least one clip 72 to retain loose wires. The front cover plate 50 is made of a metal or plastic material and is integral and unitary with the top cover plate 30. The front cover plate 50 may include a sweep 74 which extends transversely therealong, preferably substantially the entire length of the trailer hitch 14. The sweep 74 is made of an elastomeric or rubber-like material and is held in a track 76 of the front cover plate 50 by suitable means such as an interference fit or an adhesive. It should be appreciated that the sweep 74 provides limited protection to the trailer hitch 14 from stones and debris.

Optionally, the trailer hitch cover assembly 10 may include a finder plate 78 which allows looking under the trailer hitch cover assembly 10 or motor vehicle 12 without bending down on ground level for hook-up of electrical or hitch functions. The finder plate 78 may slide out of a track 78a on the front cover plate 50 or swing-out by a hinged connection (not shown) to the front cover plate 50. The finder plate 78 has a mirrored surface on at least one side and is stored in place on the track 78a or the front cover plate 50 by a release clip (not shown).

Advantageously, the trailer hitch cover assembly 10 provides a mounting surface for locating an electronic signaling device 84, such as a toll booth PASS box. The electronic signaling device 84 may be attached to either one of the top cover plate 30 or front cover plate 50, by fasteners (not shown) such as screws or by an adhesive (not shown).

Additionally, the trailer hitch cover assembly 10 may include templates (not shown) for the top cover plate 30 to allow the top cover plate 30 to be cut for clearance with factory molded drop bumpers. The templates are made of paper or cardboard and laid on the top cover plate 30 to allow the top cover plate 30 to be cut along the template with a saw such as a Jig-saw.

Figure 7:
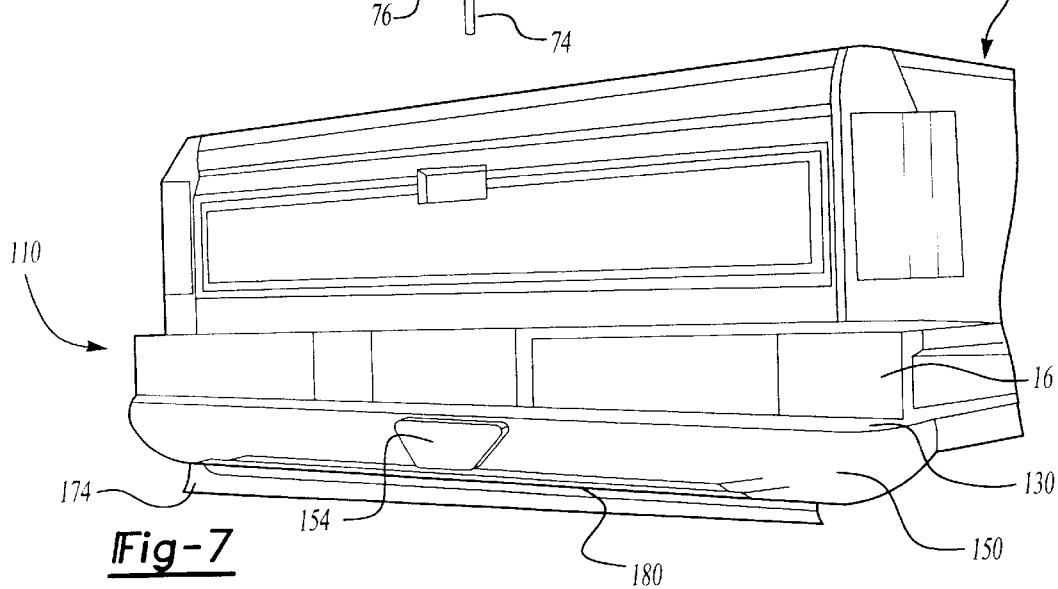
FIG. 7 is a perspective view of another embodiment, according to the present invention, of the trailer hitch cover assembly of FIG. 1.
Figure 8:
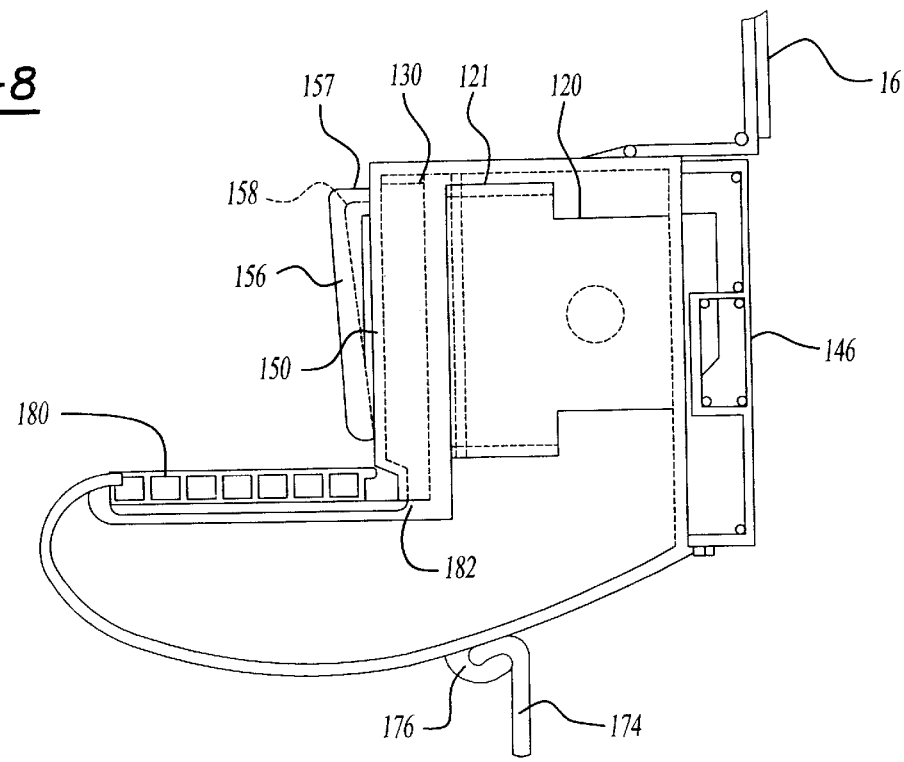
FIG. 8 is a side elevational view of the trailer hitch cover assembly of FIG. 7.
Figure 9:
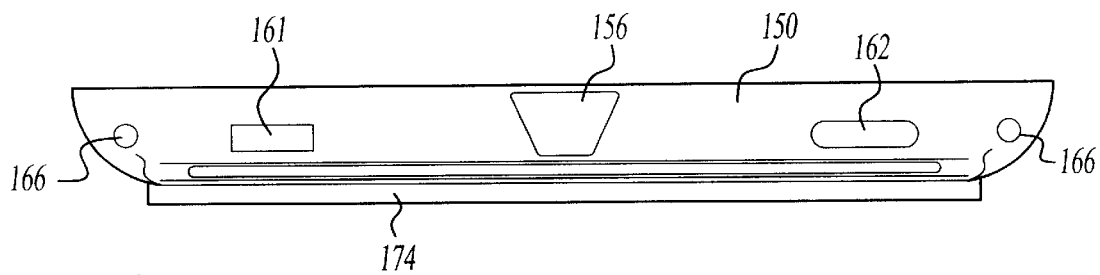
FIG. 9 is a front elevational view of the trailer hitch cover assembly of FIG. 7.

Referring to FIGS. 7 through 9, another embodiment 110, according to the present invention, of the trailer hitch cover assembly 10 is shown. Like parts of the trailer hitch cover assembly 10 have like reference numerals increased by one hundred. The trailer hitch cover assembly 110 includes a step 180 extending longitudinally and generally perpendicular to the front cover plate 150. The step 180 extends transversely a sufficient amount or predetermined length. The step 180 is supported by a support member 182 connected to the top cover plate 130 and has a reverse "L" shape extending vertically and horizontally to extend under the step 180. The support 182 is made of a metal material. It should be appreciated that the front cover plate 150 extends downwardly and longitudinally from the step 180 to cover the trailer hitch 14 or undermount of motor vehicle application.

Figure 10:
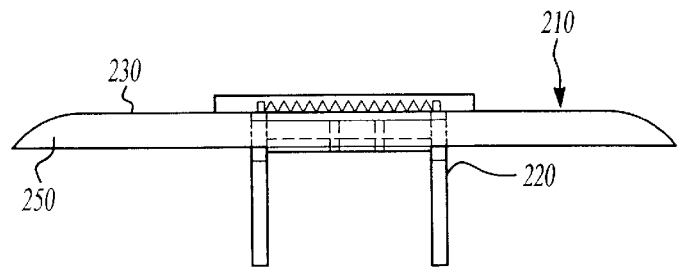
FIG. 10 is a top perspective view of yet another embodiment, according to the present invention, of the trailer hitch cover assembly of FIG. 1.

Referring to FIG. 10, yet another embodiment 210, according to the present invention, of the trailer hitch cover assembly 10 is shown. Like parts of the trailer hitch cover assembly 10 have like reference numerals increased by two hundred (200). The trailer hitch cover assembly 210 includes a hitch insert 220. The trailer hitch cover assembly 210 includes a top cover plate 230 extending transversely from a top surface of the hitch insert 220. The top cover plate 230 extends transversely along the length of the rear bumper 16 and longitudinally a sufficient or predetermined length to provide a decorative appearance. The trailer hitch cover assembly 210 also includes a front cover plate 250 extending transversely from each side of the hitch insert 220. The front cover plate 250 extends transversely along the length of the rear bumper and vertically a sufficient or predetermined length to provide a decorative appearance. It should be appreciated that the top cover plate 230, front cover plate 250 and hitch insert 220 are integral and formed as one piece, and include all of the described features of the trailer hitch cover assembly 10.

Figure 11:
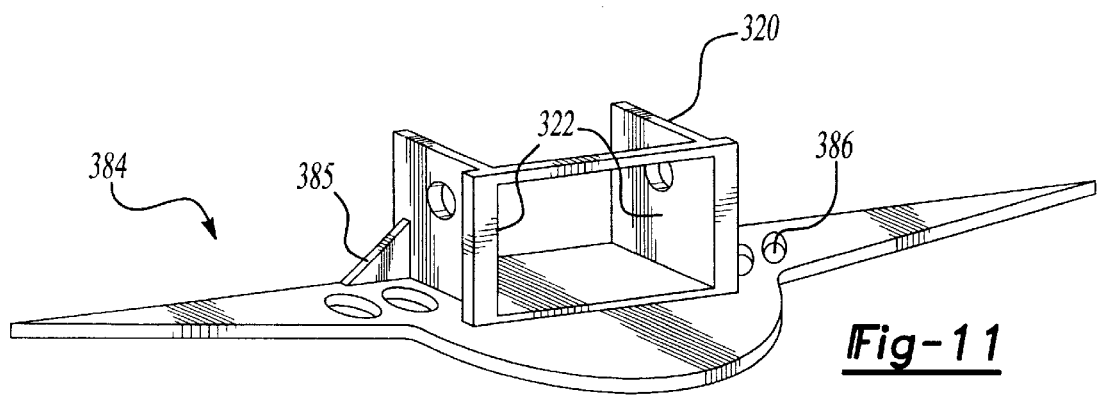
FIG. 11 is a perspective view of a step support, according to the present invention, for the trailer hitch cover assembly of FIG. 7.
Figure 12:
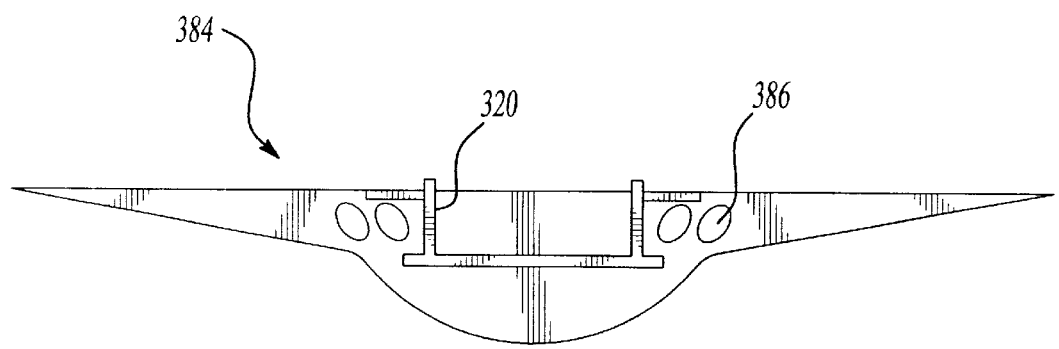
FIG. 12 is a top elevational view of the step support of FIG. 11.
Figure 13:
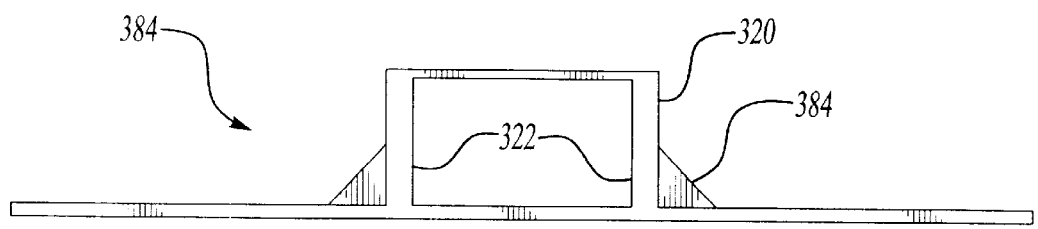
FIG. 13 is a front elevational view of the step support of FIG. 11.

Referring to FIGS. 11 through 13, another example of a step support 384 for the trailer hitch cover assembly 110 shown in FIGS. 7 and 8 is illustrated. Like parts of the trailer hitch cover assembly 110 have like reference numerals increased by three hundred (300). The trailer hitch cover assembly 110 includes a step 180 (shown in FIGS. 7 and 8) extending longitudinally and generally perpendicular to the front cover plate 50. The step 180 extends transversely a sufficient amount or a predetermined length. The step support 384 braces the step 180. The step support 384 extends transversely and generally forwardly from the hitch insert 320 a sufficient amount or predetermined length to extend under the step 180. In this example the step support 384 is positioned below the aperture 322 in the hitch insert 320. The step support 384 includes a brace 385 extending between a transversely extending portion of the step support 384 and a side of the hitch insert 320. The brace 385 provides additional strength and durability to the step support 384 in accommodating a weight on the step 180. The step support 384 may include an aperture 386 extending therethrough, such as for accommodating a tow chain. The step support 384 may be made of a plastic or a metal material. Preferably, the step support 384 and hitch insert 320 are integral and one.

Figure 14:
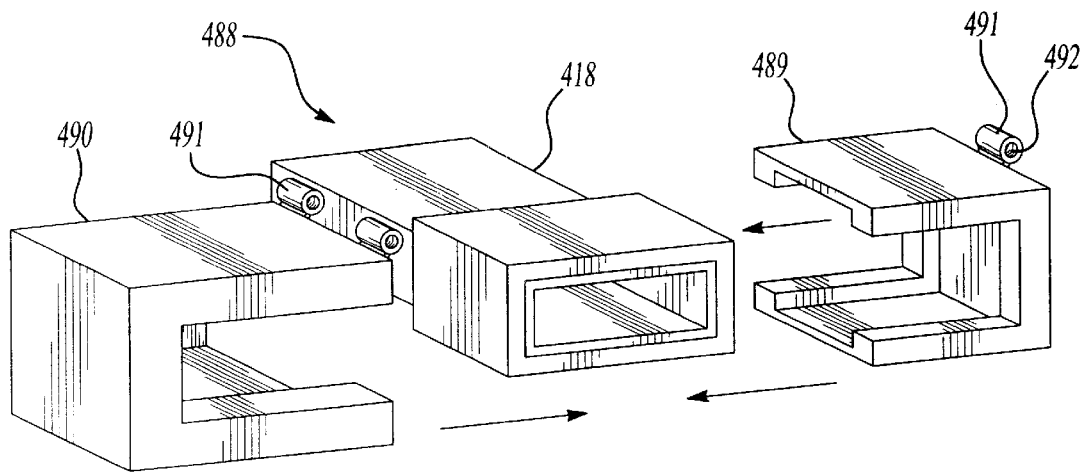
FIG. 14 is an exploded perspective view of a clamp assembly, according to the present invention, for the trailer hitch cover assembly of FIG. 1.
Figure 15:
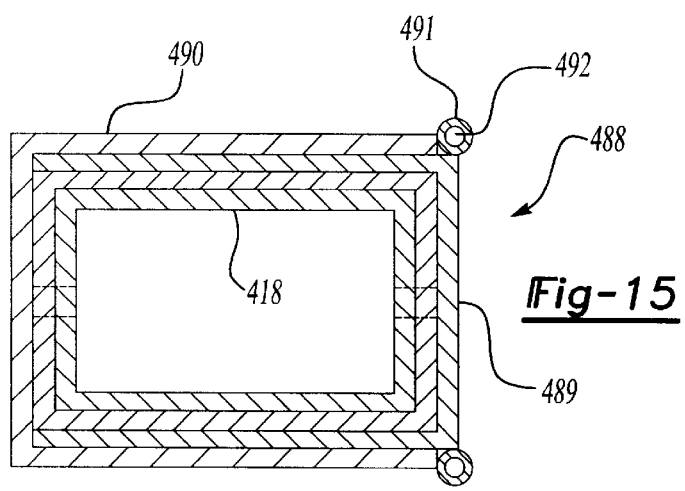
FIG. 15 is a front elevational view of the clamp assembly of FIG. 14.
Figure 16:
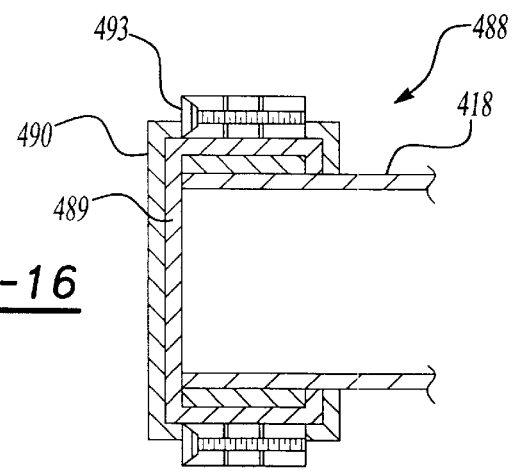
FIG. 16 is a side elevational view of the clamp assembly of FIG. 14.

Referring to FIGS. 14 through 16, the trailer hitch cover assembly 10 may include a clamp assembly 488. Like parts of the trailer hitch cover assembly 10 have like reference numerals increased by four hundred (400). The clamp assembly 488 fits over the hitch tube 418. The clamp assembly 488 includes an inner clamp 489, and an outer clamp 490 cooperatively fitting over the inner clamp 489. The inner clamp 489 and outer clamp 490 are each U-shaped. The inner clamp 489 and outer clamp 490 include at least one fastener receiving member 491 positioned on an end. The fastener receiving member 491 is a cylinder having a longitudinally extending bore 492. Preferably, there are two fastener receiving members 491 positioned on an upper end and a lower end respectively of the outer clamp 490, and spaced a predetermined distance apart. The inner clamp 489 includes a fastener receiving member 491 positioned on an upper end and lower end, respectively. Preferably, the fastener receiving member 491 is positioned on the inner clamp 489 so that it is aligned between the fastener receiving members 491 on the outer clamp 490 when the inner clamp 489 and outer clamp 491 are innerjoined, to form a single bore 492. A fastener 493, such as a screw, is screwed into the single bore 492 to securely clamp the inner clamp 489 and outer clamp 490 on the hitch insert 418.

It should be appreciated that the top cover plate 30 and front cover plate 50 may be mounted to the clamp assembly 488 (not shown). Advantageously, the clamp assembly 488 provides for freedom of towing with the clamp assembly 488 in place.

Figure 18:
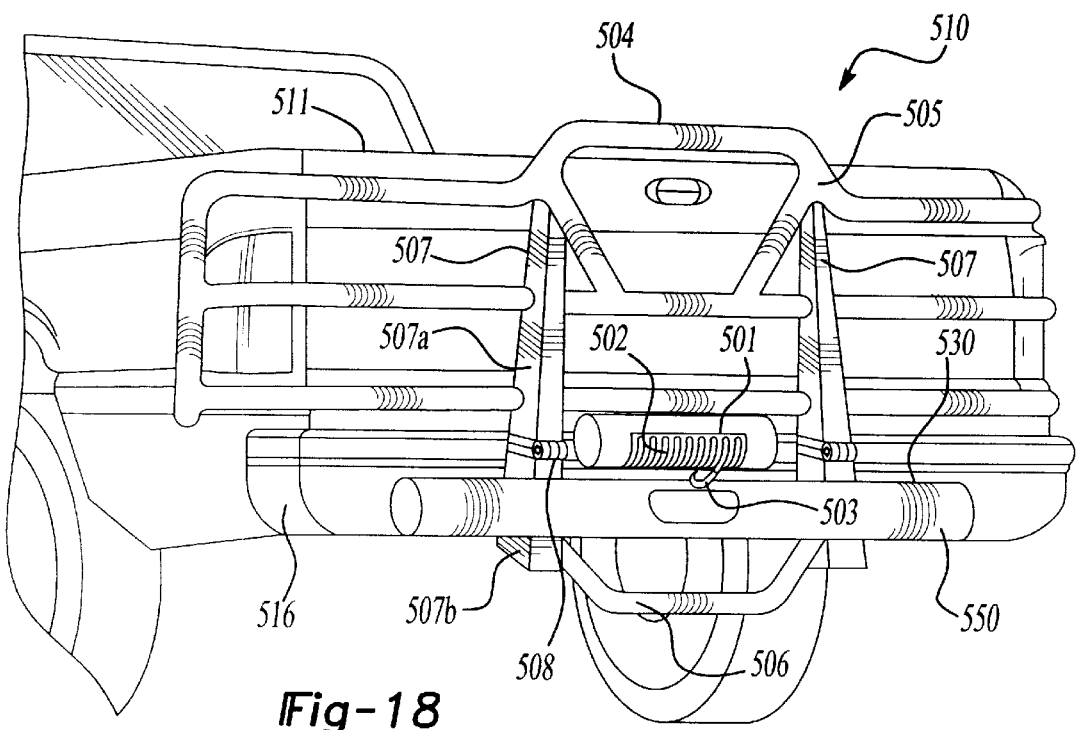
FIG. 18 is a perspective view of still another embodiment, according to the present invention, of the trailer hitch cover assembly of FIG. 1.

Referring to FIG. 18, still another embodiment 510 according to the present invention, of the trailer hitch cover assembly 10 is shown. Like parts of the trailer hitch cover assembly 10 have like reference numerals increased by five hundred (500). The trailer hitch cover assembly 510 includes a hitch insert 20 having the previously described features.

The trailer hitch cover assembly 510 includes a top cover plate 530 mounted to the hitch insert 20. The top cover plate 530 extends transversely along the length of the rear bumper 516 and longitudinally a sufficient or predetermined length to provide a decorative appearance. The trailer hitch cover assembly 510 also includes a front cover plate 550 mounted to the hitch insert 20. The front cover plate 550 extends transversely along the length of the rear bumper 516 and longitudinally a sufficient or predetermined length to provide a decorative appearance. It should be appreciated that the top cover plate 530 and front cover plate 550 are integral and formed as one piece to provide a decorative appearance, and include all of the described features of the trailer hitch cover assembly 10. In this example the top cover plate 530 and front cover plate 550 have a rounded, tubular shape. It should also be appreciated that the top cover plate 530 and front cover plate 550 may provide a step.

The trailer hitch cover assembly 510 may also include a wench 501. Preferably the wench 501 is mounted to the hitch insert 20 and hitch tube 18. The wench 501, as is known in the art, includes a cable 502 and a tow hook 503 affixed to an end of the cable 502.

The trailer hitch cover assembly 510 also includes a rear guard 504, as is known in the art, fixedly attached to the motor vehicle 12, in a manner to be described. The rear guard 504 includes a plurality of tubularly shaped members 505 extending transversely along the length of the rear end of the motor vehicle 12. Preferably, the tubular shaped members 505 are interconnected to form a predetermined pattern that may be decorative in appearance. The rear guard 504 is positioned mainly above the front cover plate 550 and top cover plate 530. Advantageously, a tubularly shaped member 506 may extend below the front cover plate 550 and top cover plate 530 to form an additional step.

The portion of the rear guard 504 positioned above the top cover plate 530 may be pivotal about a fixed pivot point. The rear guard 504 includes a hingeable member 507, and preferably two hingeable members 507. An upper arm 507a of the hingeable member 507, rotates about a hinge 508, while a lower arm 507b of the hingeable member 507 is fixedly attached to the vehicle 12. For example, the lower arm 507b may be fixedly attached to the hitch tube 18. Advantageously, the rear guard 504 is pivotal to accommodate the opening of a rear tailgate 511 of the motor vehicle 12.

Figure 19:
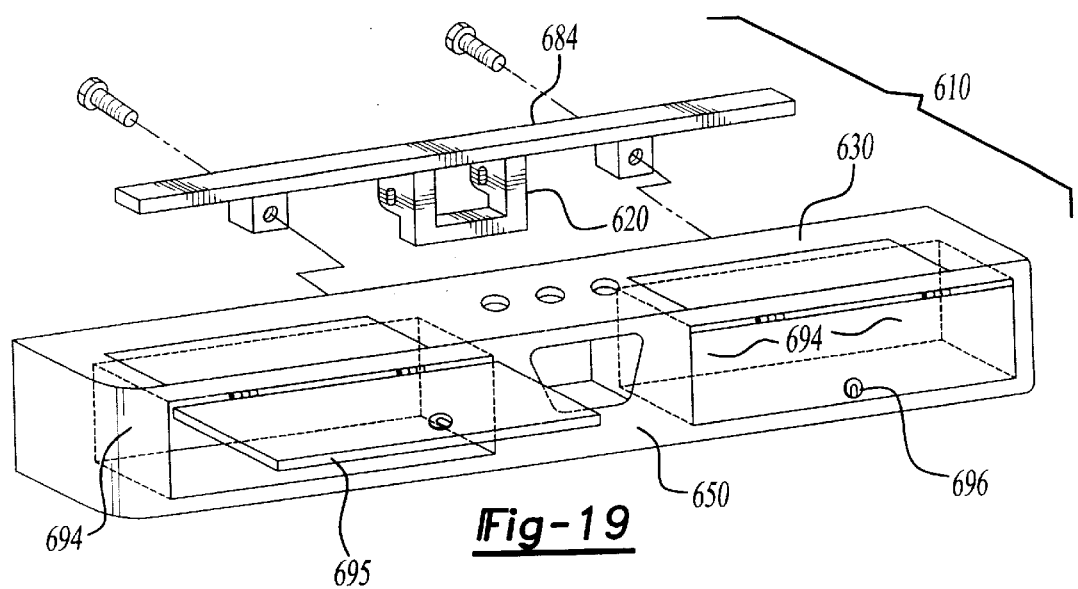
FIG. 19 is a perspective view of still yet another embodiment, according to the present invention, of the trailer hitch cover assembly of FIG. 1.

Referring to FIG. 19, still yet a further embodiment 610, according to the present invention, of the trailer hitch cover assembly 10 is shown. Like parts of the trailer hitch cover assembly 10 have like reference numerals increased by six hundred (600). The trailer hitch cover assembly 610 includes a top cover plate 630 and a front cover plate 650, that include all of the described features of the trailer hitch cover assembly 10. It should be appreciated that the top cover plate 630 and front cover plate 650 also function as a step. The front cover plate 630 may include one, and preferably a plurality of storage recesses 694 to form a storage box for the trailer hitch cover assembly 610. The storage recess 694 may be covered by a hingeable storage box cover 695. It should be appreciated that the storage box cover 695 may include a locking mechanism 696 to protect any contents that may be stored within the storage recess 694. Advantageously, the storage box cover 695 forms a seal to prevent the entry of moisture into the storage recess 694.

The hitch insert 620 includes a step support 684 extending transversely and forwardly from the hitch insert 620. The step support 684 adds structural support for the storage recess 694 and the step feature of the trailer hitch cover assembly 610.

Figure 20:
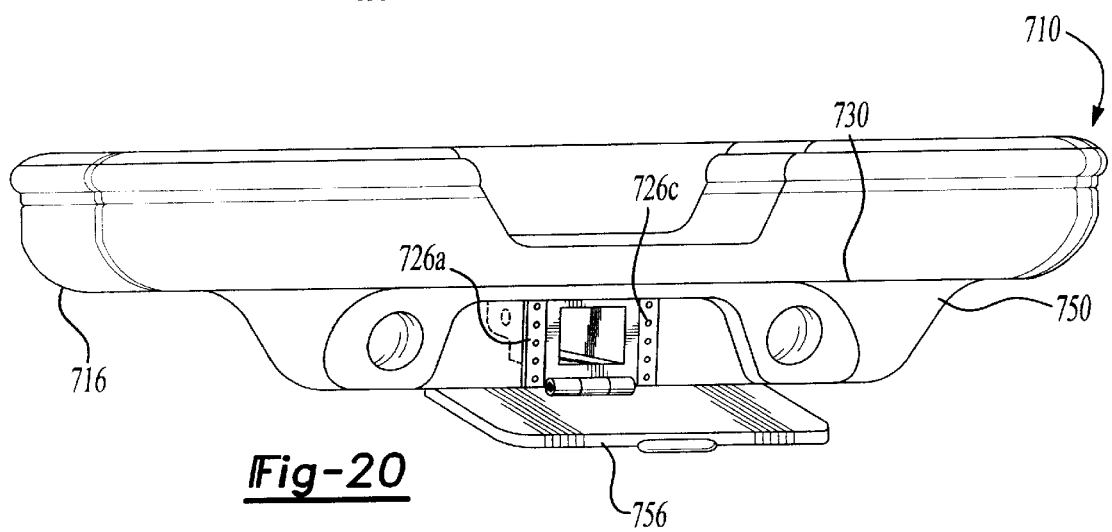
FIG. 20 is a perspective view of a further embodiment, according to the present invention, of the trailer hitch cover assembly of FIG. 1.
Figure 21:
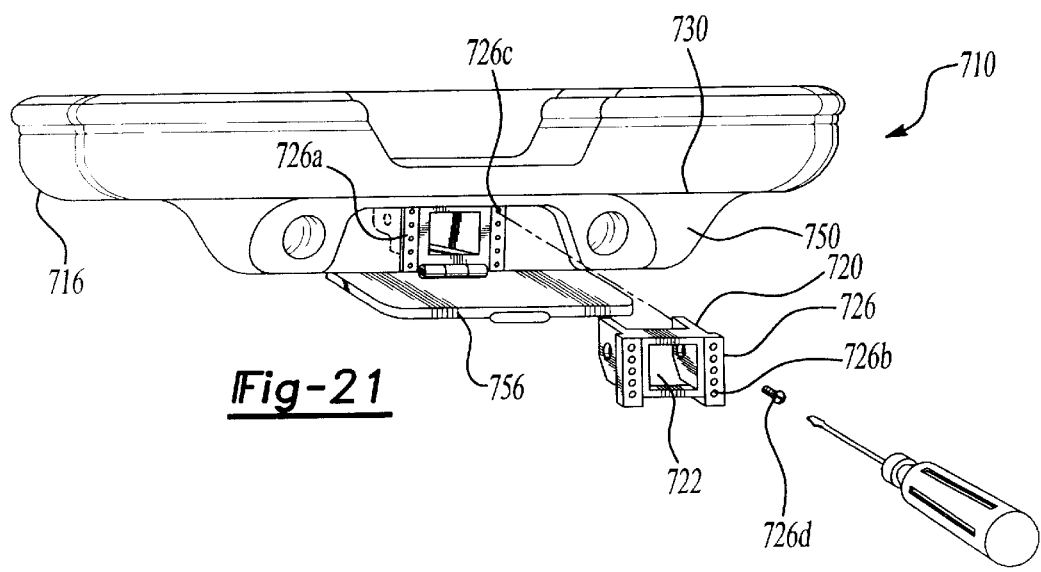
FIG. 21 is an exploded view of the trailer hitch cover assembly of FIG. 20.

Referring to FIGS. 20 and 21, still a further embodiment 710, according to the present invention, of the trailer hitch cover assembly 10 is shown. Like parts of the trailer hitch cover assembly 10 have like reference numerals increased by seven hundred (700). The trailer hitch cover assembly includes a hitch insert 720. The hitch insert 720 is generally rectangular in shape and has an aperture 722 extending longitudinally therethrough to fit over the hitch tube. The hitch insert 720 includes a flange 726 extending transversely on each side at a forward end of the aperture 722. The flange 726 includes a plurality of vertically arranged alignment apertures 726b for a function to be described.

The trailer hitch cover assembly includes a top cover plate 730. The top cover plate 730 extends transversely along the length of the rear bumper 716 and longitudinally a sufficient or predetermined appearance to provide a decorative appearance. The trailer hitch cover assembly also includes a front cover plate 750. The front cover plate 750 extends transversely along the length of the rear bumper 716 and longitudinally a sufficient or predetermined appearance to provide a decorative appearance. Preferably, the top cover plate 730 and front cover plate 750 are integral and one.

The front cover plate 750 includes a rotatable door 756. The door 756 is pivotally connected such as by a pin member (not shown) to the front cover plate 750 and is urged into a closed position by a spring (not shown). The door 756 may include indicia such as logo or the like. Advantageously, the door 756 in an open position may provide a step.

The front cover plate 750 also includes two parallel tracks 726a positioned behind the door 756. The tracks 726a are generally rectangular, and extend vertically. The tracks 726a include a plurality of vertically arranged apertures 726c. The hitch insert 720 is secured to the front cover plate 750 by sliding the flange 726 portion of the hitch insert 720 into the track 726a in the front cover plate 750. The trailer hitch cover assembly 710 is then secured on the hitch tube. The slide track 726a can be vertically adjusted relative to the flange 726 to achieve a desired fit of the trailer hitch cover assembly 710. With the aperture 726c in the slide track 726a in alignment with the aperture 726b in the flange 726, a fastener 726d such as a one way screw, is placed through the apertures 726b, 726c to secure the hitch insert 720 to the front cover plate 750. Advantageously, the trailer hitch cover assembly 710 is adjustable to accommodate a range of bumper styles.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trailer hitch cover assembly comprising:
   a clamp assembly having an aperture extending longitudinally therethrough to fit over a hitch tube of a trailer hitch on a motor vehicle;
   said clamp assembly including an inner clamp disposed over the hitch tube and an outer clamp disposed over said inner clamp; and
   a front cover mounted to said clamp assembly and having an aperture extending therethrough aligned with the hitch tube of the trailer hitch.

2. A trailer hitch cover assembly as set forth in claim 1 wherein said inner clamp and said outer clamp are U-shaped.

3. A trailer hitch cover assembly as set forth in claim 1 wherein said clamp assembly includes a fastener receiving member and a fastener for securing the clamp assembly onto the hitch insert.

4. A trailer hitch cover assembly comprising:
   a clamp assembly having an aperture extending longitudinally therethrough to fit over a hitch tube of a trailer hitch on a motor vehicle;
   said clamp assembly including an inner clamp disposed over the hitch tube and an outer clamp disposed over said inner clamp;
   a front cover mounted to said clamp assembly and having an aperture extending therethrough aligned with the hitch tube of the trailer hitch; and
   wherein said inner clamp includes a fastener receiving member positioned on an upper end and a lower end respectively, and said outer clamp includes two fastener receiving members positioned on an upper end and a lower end respectively, such that said outer clamp fastening receiving members and said inner clamp fastening mechanisms are in alignment to receive the fastener.

* * * * *